United States Patent [19]
Stalley et al.

[11] 3,949,416
[45] Apr. 6, 1976

[54] DROP OUT COMPENSATION SYSTEM

[75] Inventors: Anthony Donald Stalley, Camberley; John Albert Coffey, Newbury, both of England

[73] Assignee: Quantel Limited, England

[22] Filed: Sept. 5, 1974

[21] Appl. No.: 503,586

[30] Foreign Application Priority Data
Sept. 11, 1973 United Kingdom.............. 42761/73

[52] U.S. Cl. ........................ 358/8; 360/38; 360/36; 178/6.6 DC
[51] Int. Cl.² ...................... H04N 5/76; G11B 5/09
[58] Field of Search .......... 358/8, 13, 14, 4; 360/38, 360/36, 39; 178/69.5 DC, 6.6 DC

[56] References Cited
UNITED STATES PATENTS

| | | | |
|---|---|---|---|
| 3,586,762 | 6/1971 | Hodge et al. | 358/8 |
| 3,699,246 | 10/1972 | Hodge | 360/38 |
| 3,716,663 | 2/1973 | Bolger | 358/8 |
| 3,755,621 | 8/1973 | Krause et al. | 360/38 |
| 3,824,620 | 7/1974 | Langer | 360/38 |

*Primary Examiner*—Robert L. Griffin
*Assistant Examiner*—R. John Godfrey
*Attorney, Agent, or Firm*—Dowell & Dowell

[57] ABSTRACT

The drop out compensation system comprising input means for accepting a colour or monochrome picture information signal, output means, a drop out compensating signal generator, switch means for effecting connection of said input means to said compensating signal generator and for effecting connection between said compensating signal generator and said output means, and a drop out detector for effecting switching of said switch means, said compensating signal generator including delay means for providing a delayed output signal of the information signal entering the delay means, adder means for summing the information arriving simultaneously at the delay means and said delayed output, means for reducing the level of the signal from the compensating signal generator so that the low frequency luminance level of said resulting compensating signal at said output means has a value the same as that in the colour picture information signal at the input means, and storage means for effecting a delay within the compensating signal generator equal to at least one scanning line time. The resulting compensating signal at said output means has the correct luminance and hue values, but with a reduced saturation value. The compensating signal on the occurrence of a drop out is fed into the picture line being scanned at the correct time and in the correct phase relationship.

17 Claims, 9 Drawing Figures

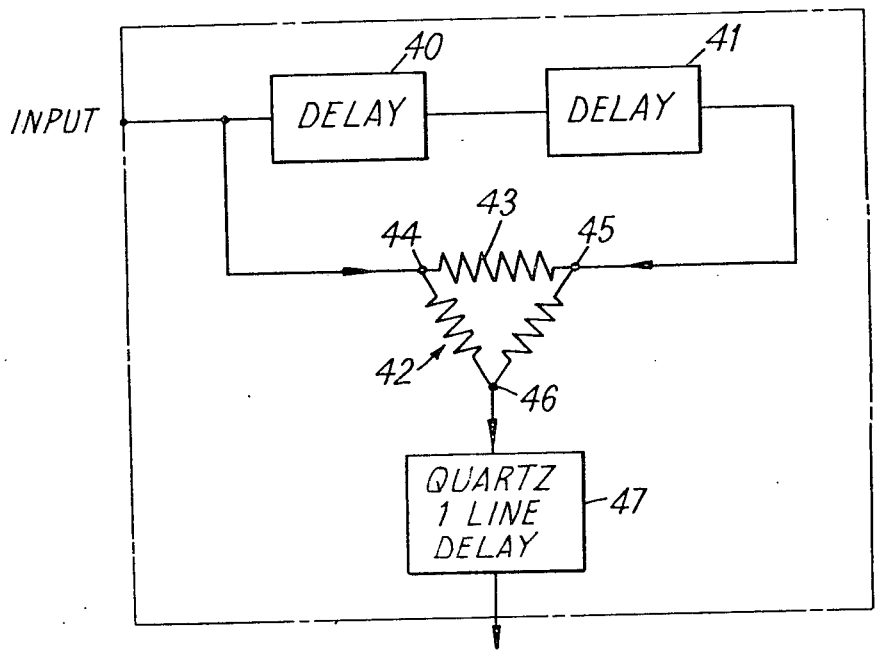
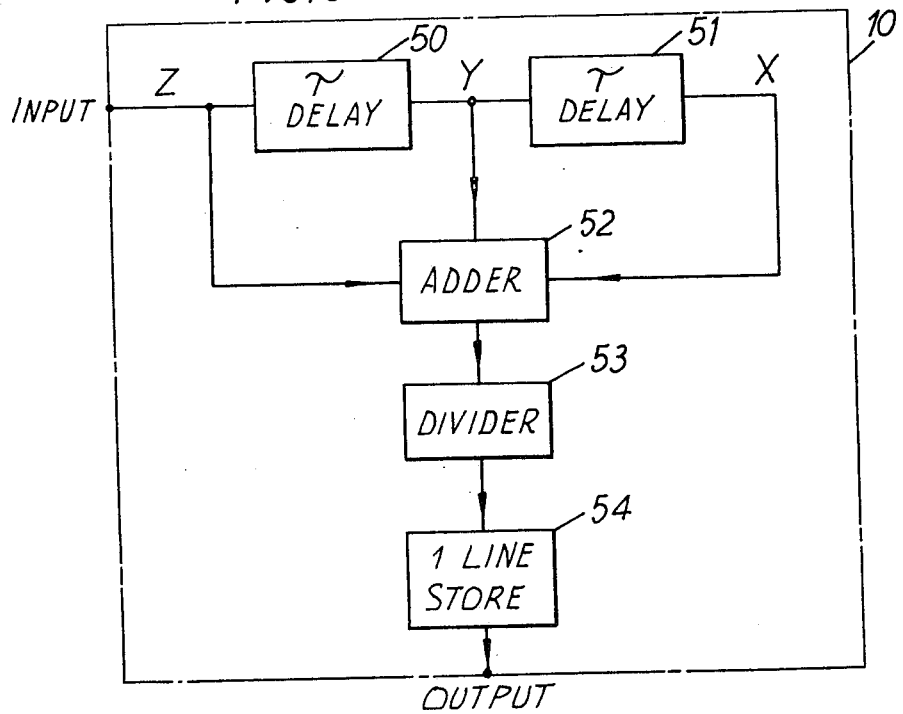

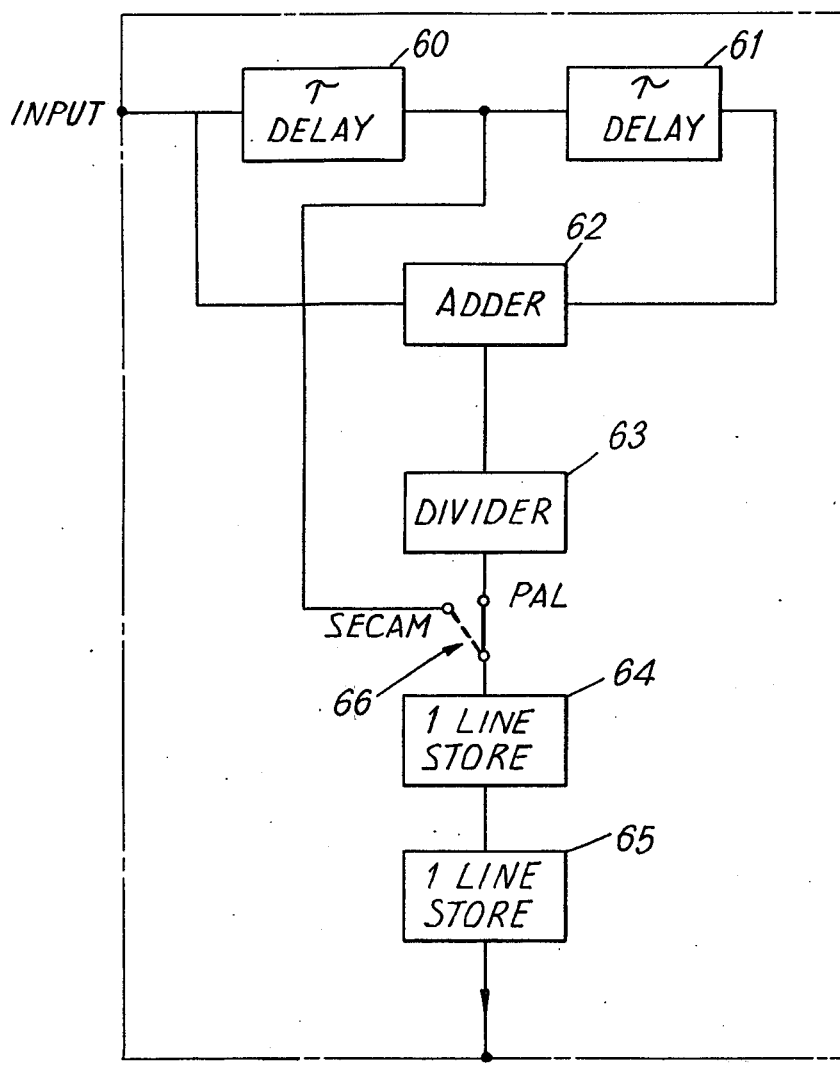

DROP OUT COMPENSATION SYSTEM

BACKGROUND TO THE INVENTION

This invention relates to a drop-out compensation system for the replay of television signals recorded on magnetic tape and more particularly to the reproduction of colour picture information recorded on magnetic tape. The term "drop-out" is a known term in the television signal production art referring to the loss of signal occurring as a result of discontinuities in a signal caused by inconsistencies in the recording medium. Such inconsistencies may occur as a result of dirt on the magnetic tape or possibly as a result of a gap in the oxide layer of the tape.

The effect of drop-outs on a displayed television picture is to cause flashes in the displayed picture. To minimise the visibility of flashes on the displayed picture, various techniques are used to compensate for the effects of drop-outs. The missing picture signal can be replaced by:

a. a fixed luminance level preset to some value between black and white,
b. a luminance value equal to the mean level of the picture over some period prior to the drop-out,
c. repetition of the picture signal line preceding the drop-out by the use of some storage medium.

The best form of compensation is provided by method (c) in which a delay circuit or store of one picture scanning line duration is continuously fed with the replayed video signal; when a drop-out occurs the signal at the output of the one line delay circuit is substituted, so that the missing picture information in a scanning line is replaced by that from the scanning line above that in which the drop-out occurred.

In particular, when handling colour television signals recorded on magnetic tape it is desirable that the drop-out compensation should re-insert a signal of the correct hue and saturation. However, the colour information, as is well known, is carried as the modulation of a subcarrier whose frequency bears a non-integral relationship with the line scanning frequency. In fact, in the case of the American NTSC colour system, the subcarrier frequency is a multiple of the line scanning frequency plus a half scanning line frequency cycle. Therefore, since in any one scanning line there will be 227.5 cycles of the subcarrier frequency the same colour information on adjacent lines has a 180° phase relationship. It follows, therefore, that a simple drop-out compensator of the type used in the method (c) above when reinserting the colour picture information from the previous line, would insert the correct luminance and colour saturation values but with the complementary hue. One solution to this problem is known to lie in the shortening of the one line delay time by the period of one half cycle of subcarrier frequency, so that the reinserted colour information has the correct phase. Unfortunately, the reinserted picture information is offset horizontally by the same amount, which may for example result in a niche in a vertical line in the displayed picture.

When processing such television signals in digital form, it is customary to sample and quantize the analogue signal into the digital form at a frequency three times the colour subcarrier frequency. This implies that the combined luminance and modulated chrominance information is described by a digital word three times during each cycle of the subcarrier. Since the digital sampling process occurs regularly, it follows that the chrominance information is described at intervals of 120° of the subcarrier. When using the quantized NTSC colour signal from the previous scanning line to compensate for drop-outs, the signal must be suitably processed to obtain the correct relationship between the reinserted signal and the picture information of the presently scanned line. A horizontal shift of the combined luminance and chrominance information equivalent to 180° of the subcarrier is not possible since the signal is described at 120° intervals. Furthermore, a time displacement of the reinserted signal of 120° or one clock period would result in the reinserted colour information being demodulated and displayed with a 60° phase error.

SUMMARY OF THE INVENTION

According to the present invention there is provided a drop-out compensation system for use with a composite colour television signal when the chrominance components are not separated from the luminance components comprising input means for accepting a colour or monochrome picture information signal, output means, a drop-out compensating signal generator, switch means for effecting connection of said input means to said compensating signal generator and for effecting connection between said compensating signal generator and said output means, and a drop-out detector for effecting switching of said switch means, said compensating signal generator including delay means for providing a delayed output signal of the information signal entering the delay means, adder means for summing the information arriving simultaneously at the delay means and said delayed output, means for reducing the level of the signal from the compensating signal generator so that the low frequency luminance level of said resulting compensating signal at said output means has a value the same as that in the colour picture information signal at the input means, and storage means for effecting a delay within the compensating signal generator equal to at least one scanning line time; wherein said resulting compensating signal at said output means has the correct luminance and hue values, but with a reduced saturation value, which compensating signal on the occurrence of a drop-out is fed into the picture line being scanned at the correct time and in the correct phase relationship.

BRIEF DESCRIPTION OF THE DRAWINGS

Embodiments of the invention will now be described by way of example with reference to the accompanying drawings, in which, FIG. 7 shows a compensating signal generator circuit suitable for use in a NTSC analogue system, FIG. 8 shows a compensating signal generator circuit suitable for use in a PAL digital system, and FIG. 9 shows a compensating signal generator circuit suitable for use in a dual PAL/SECAM system.

DESCRIPTION OF THE PREFERRED EMBODIMENT

Figure 1:
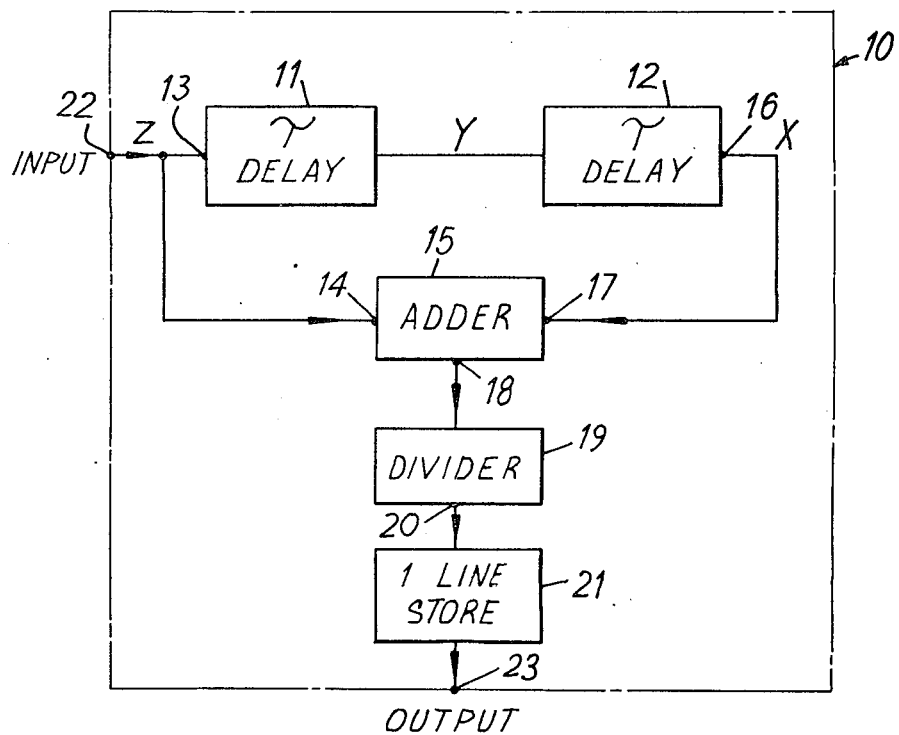
FIG. 1 is a block schematic diagram of a drop-out compensating signal generator and store therefor.

Referring now in more detail to FIG. 1, there is shown a compensating signal generator and store having two series connected delay circuits 11, 12 each giving a delay time of 93 ns. The input 13 of the first delay circuit 11 is connected to one input 14 of an arithmetic adder circuit 15. The output 16 of the second delay circuit 12 is connected with another input 17 of the adder circuit 15. The output 18 of the adder circuit 15 is connected with the input of a divide by 2 circuit 19 which has an output 20 from which the resulting reinstating signal is fed to one television scan line store 21. The input to the circuit is at 22.

This circuit provides a reinserting signal, i.e. a drop-out compensation signal, which is correctly timed, has the correct low frequency luminance level and the correct hue, but has a reduced colour saturation component. However, before discussing the operation of the circuit the meaning of the vector diagrams are now described, since these will aid the understanding of the circuit operation.

Figure 2:
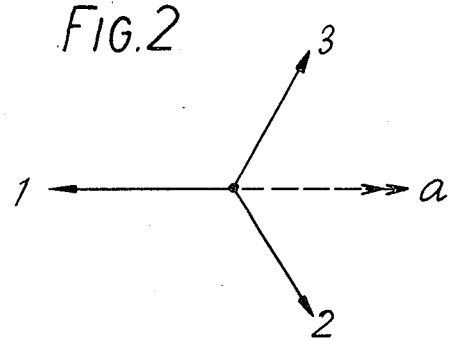
FIG. 2 is a vector diagram illustrating the vector relationship of the chrominance part of a colour signal successively digitally sampled at 120° intervals.

Referring initially to FIG. 2, this illustrates the vector relationship of the chrominance part of a colour picture signal which is processed digitally at a frequency three times the subcarrier frequency, so that the luminance and chrominance information is described by a digital word three times during each cycle of the subcarrier, the vectors 1, 2 and 3 representing successive samples at 120° intervals.

Vector a in anti-phase with vector 1 is formed as the vector arithmetic sum of vectors 2 and 3. However, if the addition of samples represented by vectors 2 and 3 is taken, a doubling of the low frequency luminance components of the signal results. To maintain the original level of the low frequency luminance components, the resultant of the vector addition of samples 2 and 3 must be halved. Therefore, the vector a is representative of an output signal with the correct time relationship, the correct low frequency luminance amplitude, the wanted hue but with half the colour signal amplitude or saturation. In practice the digital sampling process which takes place when the television signal is quantized whilst occurring at three times the subcarrier rate, is modified from line to line such that the pattern of the sampling repeats precisely from line to line.

Figure 3:
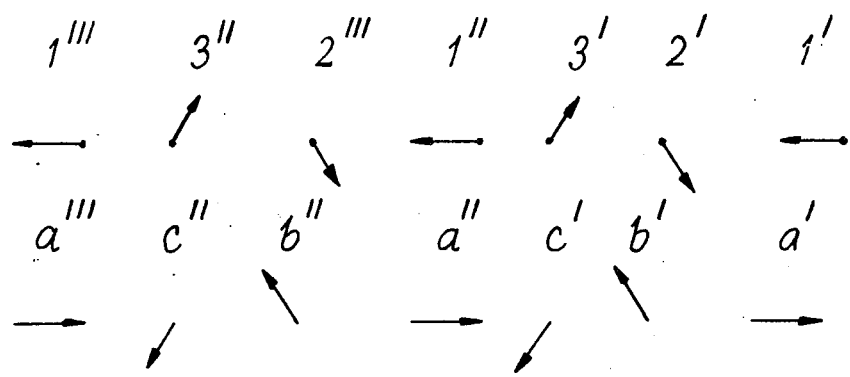
FIG. 3 illustrates vectorially the phase relationship of the subcarrier on successive scanning lines.

FIG. 3 shows the phase relationship of the sampled colour subcarrier signal on successive lines of the same television field in the NTSC colour system, the suffix ', '', or ''' indicating 1st, 2nd, and 3rd groups of 3 samples. To compensate for a drop-out the required information is, in this example, created from the samples of the previous line. To create the wanted vector $a''$ in a scanning line the arithmetic process previously described is performed on vectors 2'' and 3'. Similarly, vector $b''$ is the arithmetic sum of vectors 3'' and 1''. Likewise, $c''$ is formed from vectors 1''' and 2''. Information from the previous line is made available for the processing just described by successively writing into and reading from some suitable means of digital storage.

With the above described vectorial addition in mind, the operation of the circuit of FIG. 1 will now be described.

The luminance and chrominance signals of a compatible colour signal are fed into the circuit via its input 22. These signals are fed to both the delay circuits 11, 12 and the input 14 of the adder circuit 15. The delay imparted to the signals in each delay circuit is equal to the sampling period of one digital word. Therefore, it will be seen that when an output signal is present on the output 16 of delay circuit 12, separate but successive sampling signals will be present simultaneously at the junction of the delay circuits 11, 12 and at the input 13 to the delay circuit 11. These successive signals are indicated by the letters $x$, $y$ and $z$ and correspond to the vectors 1, 2 and 3.

With the circuit operative as shown in FIG. 1, signals $x$ and $z$ (vectors 1 and 3) are applied simultaneously to the adder circuit 15 which adds the signals together and provides an output signal in which the low frequency luminance component of the colour signal is twice the value of the luminance level at the input 22. To compensate for this excessive luminance level, the output signal from the adder 15 is fed into the divider circuit 19 where it is divided by two.

The output signal on the output 20 of the divider circuit is, therefore, of the correct luminance level, is correctly timed with the sampling signal at $y$ and is 180° out of phase with the vector at $y$. The application of this signal as a drop-out compensation signal provides reinserted information which will be displayed as a colour signal of correct luminance and correct hue, but with a 50% reduction in the colour saturation value.

While the above operation of the circuit of FIG. 1 has been described with a particular combination of the sampled signals in relation to the delay circuits 11, 12, the sampled signals are, of course, continuously changing resulting in the production of drop-out compensation signal at any signal sampling time during the transmission of actual picture information.

The circuit described can physically be formed using known integrated circuit techniques and the delay circuits 11, 12 may form part of an 8 bit wide parallel word times 577 bits long shift register which is effective to provide one picture scanning line delay. The one scanning line delay in this case may be provided by a store 21 which follows the above described components 11, 12, 15, 19.

In an alternative arrangement (see FIG. 4), the one scanning line delay store may be connected with the input 22 and the output signal released is taken from the output 23 when a drop-out compensating signal is required on demand from a drop-out detector circuit (to be described later).

Figure 5:
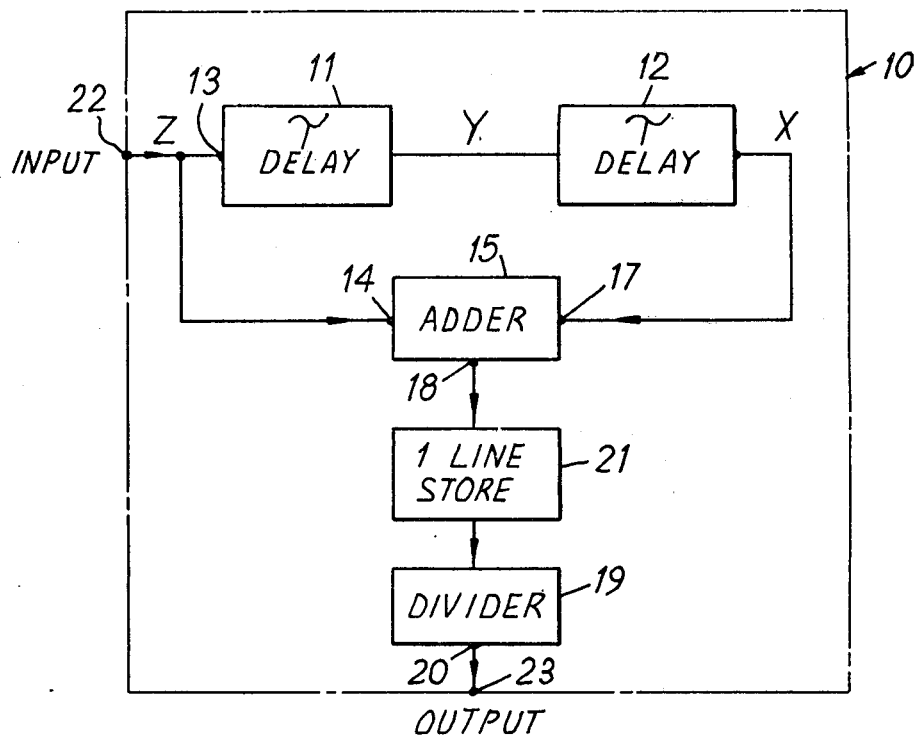
FIGS. 4 and 5 are block schematic diagrams illustrating alternative forms of the compensating circuit with the components of FIG. 2 re-arranged.

In a further modification of the invention the one scanning line delay store 21 may be located between the adder 15 and the divider 19, as shown in FIG. 5.

Figure 4:
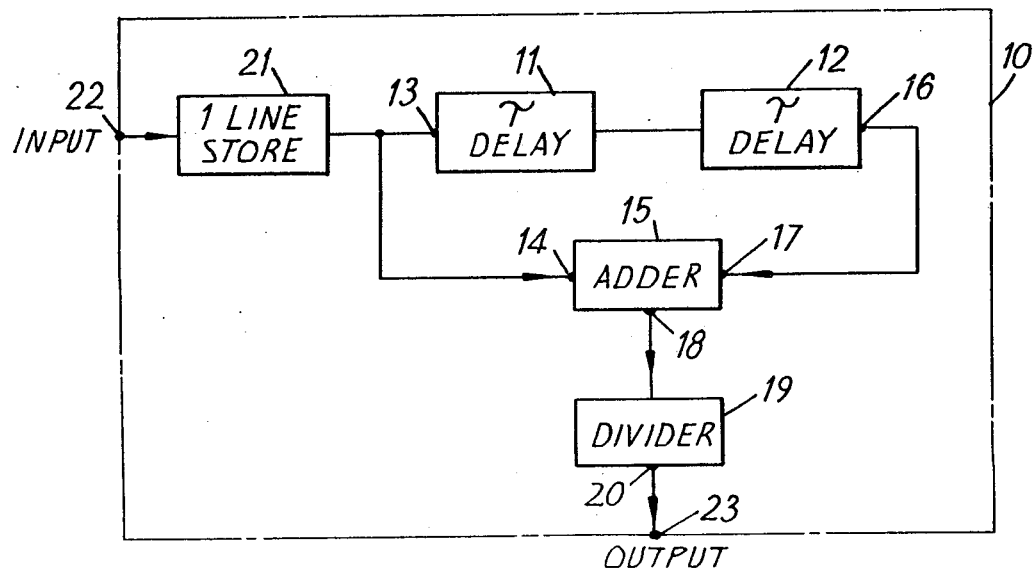
Figure 6:
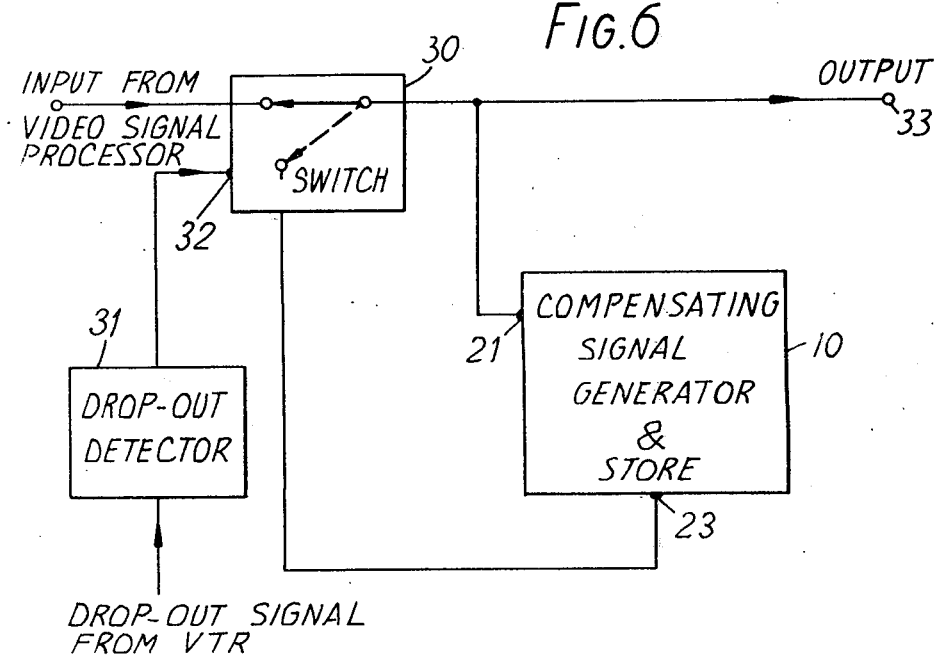
FIG. 6 shows a drop-out signal compensating circuit which includes a drop-out detector and switch means controlled thereby.

The drop-out compensating signal generator circuit of the invention as shown in FIGS. 1, 4 or 5, is connected in the circuit of a video signal processor, such as a digital time base corrector, by means of an electronic switch 30 controlled by a dropout detector 31 as shown in FIG. 6. In digital form, the drop-out compensator may comprise a 24 bit wide (8 × 3) parallel system comprising six D-type latches constituted by bistable devices coded 74174 or 74175 (Texas Instruments) forming the delay circuits 11, 12, connected to six adder circuits (Texas Instruments 74283's) forming the adder circuit 19. The outputs of these adder circuits are connected to a plurality of series connected shift registers (TMS 3417 NC) forming the one line delay store 21. Six output buffers (DM 8095's) are connected to the shift registers and form the switch which is schematically represented as the switch 30 in FIG. 6.

The digital system in which the video tape recorder is operational is an 8 bit wide parallel system as described above in relation to FIG. 1 and forms 256 levels at a rate of 10.7 MHz. However, the shift registers forming the one line delay would not be able to cope with data at the rate of 10.7 MHz, consequently the 8 bit wide parallel system is fed into a demultiplexer circuit (not shown) constituting the video signal processor input to FIG. 6 and providing a 24 bit wide (8 × 3) parallel output connectible to the input of the compensation circuit. Upon demultiplexing the 24 bit wide parallel paths operate at 3.58 MHz.

From the interconnection of the inputs and outputs of the D-type latches with the adder circuits, it is possible to obtain the same vector arithmetic within the adders as described in relation to FIGS. 1–3, to provide digital signals representative of a colour information signal in which the luminance is twice the value required and the hue and saturation values are correct, the signal also being correctly timed. Since the luminance value is too high, a division by 2 is effected digitally at the output of the adder circuits by shifting the bit significances of the output thereof.

The signal, in digital form, thus produced is fed into the store 21 where a one scanning line delay is imposed. When required, the output of the store feeds via the buffers (switch 30) into following circuits.

In normal operation of the video tape recorder, FIG. 6, the buffers are disabled in accordance with a signal, or the lack of a signal, appearing at the control input 32 from the drop-out detector 31 mentioned above, and the compensation circuit is unused. When a drop-out occurs, this is detected by the drop-out detector so that the buffers are disabled to open circuit the demultiplexing circuit output so that no information is fed into the compensation circuit 10, and to enable the buffer so that the stored information at that time is fed out of the store 21 into the output 33 to following circuits. After the drop-out has occurred, the demultiplexing circuit output is connected to the output and the buffers 30 disabled.

Consequently, should a further drop-out occur at exactly the same point one line later, the reinserted signal will not be a blank caused by the previous drop-out, but will be the recirculated signal fed back from the store.

Although the above described circuits have been described with reference to digital sampling, analogue techniques may be used to obtain the same effects with analogue signals. The analogue arrangement equivalent to the digital system shown in FIG. 1 is shown in FIG. 7. The delay circuits 40,41 consisting of coaxial cable or LC components each introduce a delay of 93 ns, i.e. one third the subcarrier frequency period. The adder circuit 42 comprising delta connected resistors 43, sums the voltages appearing at inputs 44, 45 and gives out a voltage equal to one half of the sum at the output 45. The one scanning line time delay 47 comprises an ultrasonic quartz delay line giving a delay of approximately 63.5 μsecs.

The above described invention is particularly directed towards the NTSC (National Television System Committee of America) colour system. However, the application of the invention to the PAL (Telefunken system) colour system is not precluded.

In the case of the PAL colour system, the subcarrier phase relationship between successive lines is more complex. In FIG. 8 there is shown a suitable drop-out compensation signal generator circuit operating with digital circuitry comprising delays 50, 51, an adder 52, a divide by 3 circuit 53, and a one line store 54. A signal suitable for drop-out compensation can be generator at the output by summing three successive picture samples X, Y and Z where the interval between samples is one third of the subcarrier period. By this means the chrominance information is cancelled. Dividing the sum by 3 re-establishes the correct low frequency luminance level. Since the PAL signal decoder in the colour picture display device averages the chrominance information over two successive lines, the reinserted luminance information will once again be displayed as a colour signal of correct hue but with 50% saturation. The interconnection between the delay circuits is connected with the adder circuit 52 to facilitate the arithmetic summation of the three successive samples.

Another possible arrangement for the PAL system is to reinsert information which occurred two lines earlier. In the case of PAL the chrominance information on that line will have the correct V axis phase but will be approximately 180° out of phase with respect to the mean reference burst phase at the time of reinsertion. This is similar to the NTSC case for information reinserted from the previous line and the processing circuitry to achieve 180° phase shift at subcarrier frequency can, therefore, be identical to that described in the NTSC case. The drop-out compensation signal will as before have the correct low frequency luminance amplitude and chrominance hue but with a 50% reduction in the colour saturation. Since the PAL signal decoder in the colour picture display device averages the chrominance information over two successive lines, the reinserted luminance information will be displayed as a colour signal of correct hue but with 75% saturation.

In the case of the SECAM signal, it is also desirable to use information which occurred two lines earlier because of the line sequential colour modulation system that is employed. The optimum arrangement for SECAM signals will be two lines of delay with no subsequent processing, but where the drop-out compensator is to be used in a dual PAL/SECAM system satisfactory operation is provided by the previously mentioned arrangement for PAL signals. The low pass filtering action of the phase modifier produces a falling amplitude/frequency response across the chrominance band. This distortion to the chrominance signals will be removed by the limiters in the SECAM decoder. The phase inversion produced by the arithmetic is unimportant because frequency modulation is used in the SECAM system. In the dual standard PAL/SECAM system shown in FIG. 9 there are provided two delays 60, 61, an adder 62, a divide by 2 circuit 63, and two line delay stores 64, and 65. To render inoperative the phase inverting arithmetic when SECAM signals are being processed, a switch 66 is provided between the divider 63 and the store 64, the SECAM setting of said switch effecting a connection between the junction between the two delays 60 and 61 and the store 64.

We claim:

1. A drop-out compensation system for use with a composite colour television signal when the chrominance components are not separated from the luminance components, comprising:
   a. input means for accepting a colour or monochrome picture information signal;
   b. output means;
   c. a drop-out compensating signal generator;
   d. switch means for effecting connection of said input means to said compensating signal generator and for effecting connection between said compensating signal generator and said output means, and
   e. a drop-out detector for effecting switching of said switch means, said compensating signal generator including delay means for delaying the information signal entering the delay means by a period substantially equal to two thirds the subcarrier period of the picture information signal;
   f. adder means for summing the information arriving simultaneously at the delay means and said delayed output;
   g. means for reducing the level of the signal from the compensating signal generator so that the low frequency luminance level of said resulting compensating signal at said output means has a value the same as that in the colour picture information signal at the input means, and
   h. storage means for effecting a delay within the compensating signal generator equal to at least one scanning line time, wherein said resulting compensating signal on the occurrence of a drop-out is fed into the picture line being scanned at the correct time and in the correct phase relationship.

2. A drop-out compensation system according to claim 1, wherein said means for reducing the level of the signal from the compensating signal generator is connected to the output of the delay means, said storage means effecting storage of the reduced signal at the output of the signal level reducing means.

3. A drop-out compensation system according to claim 1, wherein said storage means is connected to receive the colour picture information signal, said delay means being connected to the output of said store and said signal level reducing means being connected to the output of said adder means.

4. A drop-out compensation system according to claim 1, wherein storage means is connected to the output of said adder means and the signal level reducing means is connected to the output of said storage means.

5. A drop-out compensation system according to claim 1, wherein said storage means is a one picture scanning line time delay store.

6. A drop-out compensation system according to claim 1, for application to an NTSC system using digital techniques, wherein said delay means comprises two sequentially connected delay circuits, each effecting a delay of one third the subcarrier frequency period, and said adder means includes a logic circuit for summing the signals at the input of the first delay circuit and at the output of the second delay circuit.

7. A drop-out compensation system according to claim 6, wherein the delay circuits comprise latching relays.

8. A drop-out compensation system according to claim 6, where the means for reducing the signal level effects halving the signal.

9. A drop-out compensation system according to claim 6, in which the reduction of the luminance level is effected by a reduction in bit significances at the output of the adder means.

10. A drop-out compensation circuit according to claim 6, wherein said storage means comprises shift registers.

11. A drop-out compensation system according to claim 6, wherein the switch means comprises buffers at the outputs of said storage means.

12. A drop-out compensation system according to claim 1, for application to an NTSC system using analogue techniques, wherein said delay means comprises two sequentially connected delay circuits each effecting a delay of one third the subcarrier frequency period, and said adder means includes resistors for summing the signals at the input of the first delay circuit and at the output of the second delay circuit, said storage means in the application being a quartz delay line.

13. A drop-out compensation system according to claim 12, wherein the delay circuits comprise coaxial cable or LC components giving a delay of 93 n secs and said delay line gives a delay of $63.5\mu$ secs.

14. A drop-out compensation system according to claim 1, for application to a PAL system using digital techniques, wherein said delay means comprises two sequentially connected delay circuits each effecting a delay of one sampling time and said adder means includes a logic circuit for summing the signals at the input to the first delay circuit, the interconnections between the two delay circuits and the output of the second delay circuit, said means for reducing the level of the signal being a divide by 3 circuit.

15. A drop-out compensation system according to claim 1, for application to a PAL system using digital techniques, wherein said delay means comprises two sequentially connected delay circuits each effecting a delay of one sampling time, and said adder means includes a logic circuit for summing the signals at the input of the first delay circuit and at the output of the second delay circuit, said storage means being capable of storing two scanning lines of information.

16. A drop-out compensation system according to claim 15, wherein a switch is provided between the adder means and the storage means whereby the second delay circuit, the adder means, and the divider can be made inoperative for the purpose of adapting the compensation circuit for use in a SECAM system.

17. In a time base corrector, the provision of a drop-out compensation system for use with a composite colour television signal when the chrominance components are not separated from the luminance components, comprising:
   a. input means for accepting a colour or monochrome picture information signal;
   b. output means;
   c. a drop-out compensating signal generator;
   d. switch means for effecting connection of said input means to said compensating signal generator and for effecting connection between said compensating signal generator and said output means,
   e. a drop-out detector for effecting switching of said switch means, said compensating signal generator including delay means for delaying the information signal entering the delay means by a period substantially equal to two thirds the subcarrier period of the picture information signal;

f. adder means for summing the information arriving simultaneously at the delay means and said delayed output;

g. means for reducing the level of the signal from the compensating signal generator so that the low frequency luminance level of said resulting compensating signal at said output means has a value the same as that in the colour picture information signal at the input means, and h. storage means for effecting a delay within the compensating signal generator equal to at least one scanning line time, wherein said resulting compensating signal on the occurrence of a drop-out is fed into the picture line being scanned at the correct time and in the correct phase relationship.

* * * * *